(12) United States Patent
Suh

(10) Patent No.: US 7,623,428 B2
(45) Date of Patent: Nov. 24, 2009

(54) MULTI-LAYER OPTICAL DISC AND METHOD FOR MANAGING LAYER FORMATTING THEREOF

(75) Inventor: Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/485,914

(22) PCT Filed: Jun. 7, 2003

(86) PCT No.: PCT/KR03/01116

§ 371 (c)(1),
(2), (4) Date: Oct. 8, 2004

(87) PCT Pub. No.: WO03/105141

PCT Pub. Date: Dec. 18, 2003

(65) Prior Publication Data

US 2005/0036427 A1 Feb. 17, 2005

(30) Foreign Application Priority Data

Jun. 8, 2002 (KR) ....................... 10-2002-0032183

(51) Int. Cl.
*G11B 7/00* (2006.01)
(52) U.S. Cl. ................. 369/53.2; 369/53.22; 369/47.22; 369/94
(58) Field of Classification Search ............. 369/53.22, 369/53.2, 47.22, 94
See application file for complete search history.

(56) References Cited

U.S. PATENT DOCUMENTS

| | | | |
|---|---|---|---|
| 5,365,507 A | 11/1994 | Fuji et al. | |
| 5,414,451 A | 5/1995 | Sugiyama et al. | |
| 5,608,715 A | 3/1997 | Yokogawa et al. | |
| 5,614,938 A | 3/1997 | Sugiyama et al. | |
| 5,768,221 A | 6/1998 | Kasami et al. | |
| 6,052,347 A | 4/2000 | Miyata | |
| 6,072,759 A * | 6/2000 | Maeda et al. | ............ 369/59.25 |
| 6,101,162 A | 8/2000 | Kim | |
| 6,172,955 B1 | 1/2001 | Hashimoto | |

(Continued)

FOREIGN PATENT DOCUMENTS

CN 1231473 10/1999

(Continued)

OTHER PUBLICATIONS

Korean Search Report, PCT/KR03/01116, Oct. 6, 2003.

(Continued)

*Primary Examiner*—Wayne R Young
*Assistant Examiner*—Van N Chow
(74) *Attorney, Agent, or Firm*—Harness, Dickey & Pierce, P.L.C.

(57) ABSTRACT

A high-density multi-layer optical disc and a method for managing layer formatting thereof. A high-density multi-layer optical disc such as a Blu-ray disc rewritable (BD-RE) dual layer includes management information, additionally recorded in a lead-in area, needed for identifying formatting status of a plurality of recording layers. After the management information is referred to, at least one unformatted recording layer is automatically formatted. Optionally, the unformatted recording layer is formatted on the basis of a formatting method selected by a user. The multiple recording layers formed on the high-density multi-layer optical disc can be conveniently and effectively formatted.

18 Claims, 9 Drawing Sheets

U.S. PATENT DOCUMENTS

| | | | |
|---|---|---|---|
| 6,370,102 | B1 | 4/2002 | Mons et al. |
| 6,404,713 | B1 | 6/2002 | Ueki |
| 6,510,128 | B2 * | 1/2003 | Sekii ..................... 369/275.3 |
| 6,512,731 | B1 * | 1/2003 | Seo et al. .................... 720/656 |
| 6,606,285 | B1 | 8/2003 | Ijtsma et al. |
| 6,728,177 | B2 | 4/2004 | Seong et al. |
| 6,728,186 | B2 | 4/2004 | Weijenbergh et al. |
| 6,801,494 | B2 | 10/2004 | Ross |
| 6,845,071 | B2 | 1/2005 | Shoji et al. |
| 6,859,426 | B1 | 2/2005 | Ogawa et al. |
| 6,917,572 | B2 | 7/2005 | Iida et al. |
| 7,295,762 | B2 * | 11/2007 | Sawabe et al. ................ 386/96 |
| 7,376,058 | B2 * | 5/2008 | Narumi et al. ........... 369/47.53 |
| 2002/0021656 | A1 | 2/2002 | Tsukagoshi et al. |
| 2003/0048733 | A1 | 3/2003 | Heemskerk et al. |
| 2003/0063535 | A1 | 4/2003 | Shoji et al. |
| 2003/0072233 | A1 | 4/2003 | Naoi et al. |
| 2003/0081523 | A1 | 5/2003 | Miyagawa et al. |
| 2003/0137909 | A1 * | 7/2003 | Ito et al. ................. 369/47.14 |
| 2003/0169651 | A1 * | 9/2003 | Kobayashi ............... 369/44.28 |
| 2003/0210627 | A1 * | 11/2003 | Ijtsma et al. ............. 369/53.18 |
| 2004/0085874 | A1 | 5/2004 | Akiyama et al. |

FOREIGN PATENT DOCUMENTS

| | | |
|---|---|---|
| CN | 1321980 | 11/2001 |
| EP | 768652 | 4/1997 |
| EP | 0 899 735 | 3/1999 |
| EP | 1 300 836 | 10/2002 |
| EP | 1 329 880 | 1/2003 |
| JP | 03-157816 | 7/1991 |
| JP | 03-290872 | 12/1991 |
| JP | 05-028644 | 2/1993 |
| JP | 05-101398 | 4/1993 |
| JP | 05-189765 | 7/1993 |
| JP | 08-096406 | 4/1996 |
| JP | 08-212561 | 8/1996 |
| JP | 768652 | 4/1997 |
| JP | 09-231613 | 9/1997 |
| JP | 10-011755 | 1/1998 |
| JP | 10-241167 | 9/1998 |
| JP | 10-320926 | 12/1998 |
| JP | 11-025608 | 1/1999 |
| JP | 11-242565 | 9/1999 |
| JP | 2000-311346 | 11/2000 |
| JP | 2001-014808 | 1/2001 |
| JP | 13-085195 | 3/2001 |
| JP | 13-086195 | 3/2001 |
| JP | 2001-143402 | 5/2001 |
| JP | 2001-209940 | 8/2001 |
| JP | 2002-050053 | 2/2002 |
| JP | 2002-352430 | 12/2002 |
| JP | 2003-030842 | 1/2003 |
| JP | 2001-052337 | 2/2003 |
| JP | 2003-178448 | 6/2003 |
| KR | 10-1997-0055600 | 10/1997 |
| WO | WO 96/19807 | 6/1996 |
| WO | WO 01/22416 | 3/2001 |
| WO | WO 03/019543 | 3/2003 |

OTHER PUBLICATIONS

Japanese Patent Office Action (dated Jun. 5, 2007), for corresponding Japanese Patent Application No. 2006-194024.
Office Action for Chinese patent application No. 03800989.7 dated Feb. 10, 2006.
Office Action for Japanese patent application No. 2004-512132 dated Nov. 6, 2006.
Office Action for U.S. Appl. No. 11/499,663 dated Jul. 24, 2007.
Office Action for Japanese patent application No. 2006-194024 dated Oct. 25, 2007.
Office Action for international patent application No. PCT/KR03/01110 dated Sep. 26, 2003.
Office Action for Chinese patent application No. 038012003.6 dated May 20, 2005.
Office Action for U.S. Appl. No. 10/468,675 dated Nov. 29, 2005.
Office Action for U.S. Appl. No. 10/468,675 dated Sep. 18, 2006.
Office Action for Japanese patent application No. 2004-512130 dated Oct. 31, 2006.
Office Action for Japanese patent application No. 2004-512130 dated May 29, 2007.
Office Action for Japanese patent application No. 2007-121293 dated Oct. 2, 2007.
Office Action for Japanese patent application No. 2007-121293 dated Jun. 10, 2008.
Search Report for European patent application No. 03757211.2-2210/1518228 dated Jun. 27, 2008.
Office Action for Korean patent application No. 10-2002-0032183 dated Aug. 21, 2008.
Office Action for U.S. Appl. No. 11/499,663 dated Oct. 29, 2008.
Search Report for European patent application No. 07017017.0 dated Mar. 16, 2009.
ECMA: Standardizing Information and Communication Systems: "Standard ECMA-272, $2^{nd}$ edition: 120 mm DVD Rewritable Disk (DVD-RAM)" Standard ECMA-272, XX, XX, No. 272, Jun. 1, 1999, pp. 43-55, XP002186767.
Office Action for U.S. Appl. No. 10/468,675 dated Jul. 7, 2009.

* cited by examiner

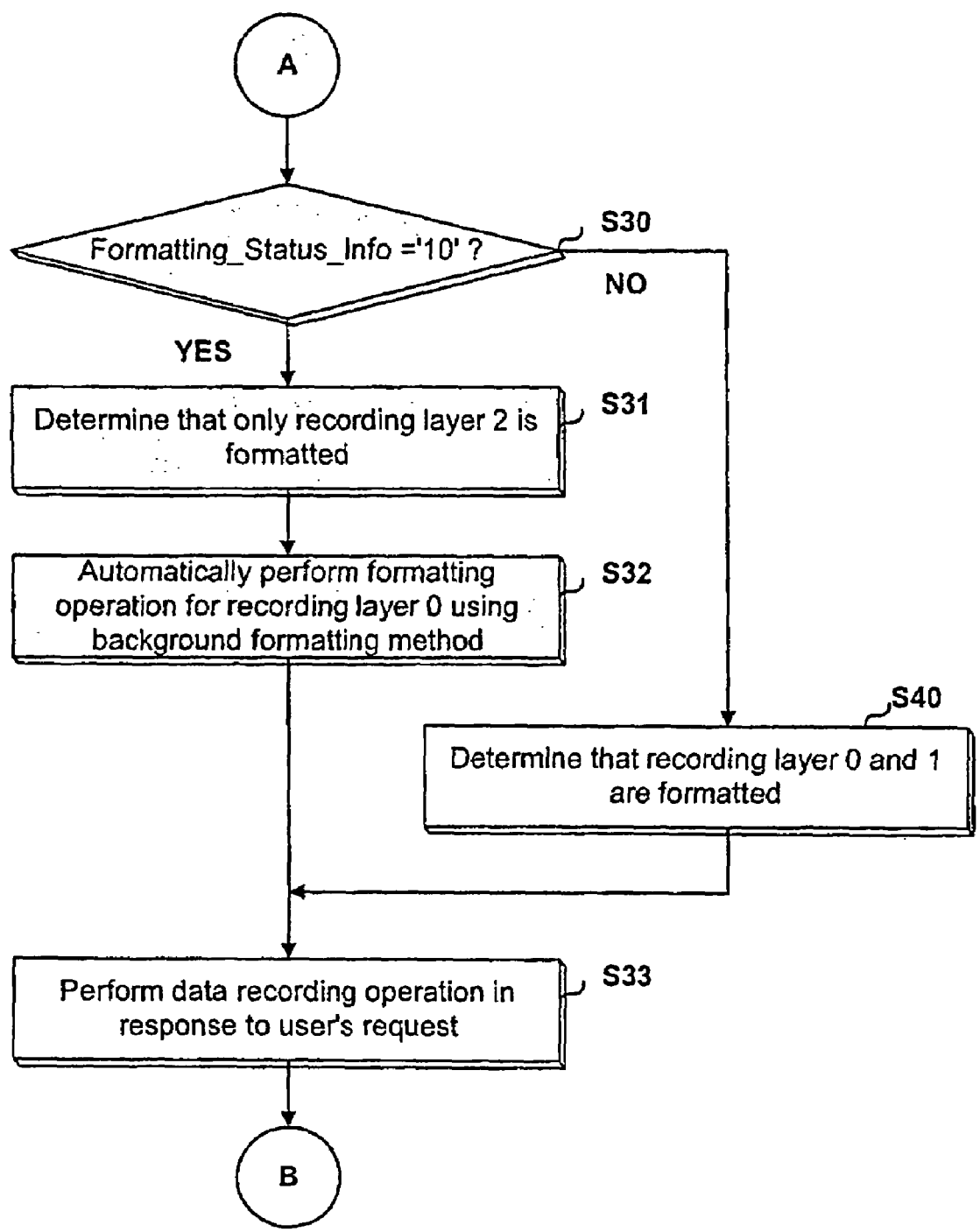

US 7,623,428 B2

MULTI-LAYER OPTICAL DISC AND METHOD FOR MANAGING LAYER FORMATTING THEREOF

1. TECHNICAL FIELD

The present invention relates to a high-density multi-layer optical disc on which multiple layers are formed and a method for managing layer formatting thereof.

2. BACKGROUND ART

As standardization of a high-density rewritable optical disc, e.g., a Blu-ray disc rewritable (BD-RE), capable of storing high-quality video and audio is rapidly progressed, it is expected that related products will be developed, commercialized and supplied.

A conventional BD-RE single layer 100 is shown in FIG. 1. As shown in FIG. 1, there is a distance of approximately 0.1 mm between a recording layer and the surface of a transparent film being arranged between the recording layer and an objective lens (OL) 11 of an optical pick-up.

When an optical disc apparatus for reading and reproducing data recorded on the recording layer of the BD-RE single layer 100 or recording data thereon determines that a defect is detected on the layer 100 while performing a data recording operation, the optical disc apparatus records the data in an inner spare area (ISA) or outer spare area (OSA) separately assigned to a data area as shown in FIG. 2, in place of a data area.

Further, the optical disc apparatus generates a defect list (DFL) entry needed for identifying a cluster associated with a recording unit block (RUB) recorded in the spare area in place of a data area, and performs a recording and management operation for the generated DFL entry.

As shown in FIG. 2, management information associated with the spare areas and defects is contained and recorded in a field of rewritable disc definition structure (DDS) information of a lead-in area. The DDS information includes information items associated with the first physical sector number (PSN) of the DFL (P_DFL) a location of a logical sector number (LSN) 0 of a user data area, the last LSN of the user data area, a size of the ISA (ISA_size), a size of the OSA (OSA_size), spare area full flags indicating whether or not the respective spare areas are full, etc.

As described above, when the defect is detected in the data area while the optical disc apparatus records data in the data area, the optical disc apparatus searches for the spare area full flags contained and recorded in the DDS information field, selects the ISA or OSA in which the data can be recorded, and performs a sequence of data recording operations for recording the data in the selected spare area.

The recording layer of the BD-RE single layer 100 must be previously formatted so that the data can be recorded on the recording layer. The layer formatting method includes a general formatting method requiring a long formatting time, a recently proposed background formatting method, etc. Here, the background formatting method is that a formatting operation is performed automatically when or whenever the recording or reproducing device is idle, and stores information associated with the location of a formatted area until a time point when a data recording request is received from a user, thereby enabling the data, corresponding to the data recording request, to be recorded in the formatted area until the time point.

A high-density multi-layer optical disc, i.e., a BD-RE dual layer, capable of recording twice as much video and audio data as the BD-RE single layer, has been developed. As shown in FIG. 3, there is a distance d2 between the first recording layer (Layer 0) and the second recording layer (Layer 1) formed in the BD-RE dual layer 200. The first and second recording layers are formed at a location, within the BD-RE dual layer 200, having a bias toward the OL 11 of the optical pick-up.

The ISA and OSA are separately assigned to each of data areas associated with the first and second recording layers of the BD-RE dual layer 200. The first and second recording layers can be linked to each other so that large-capacity data can be recorded. However, there is not yet provided a method for effectively formatting the first and second recording layers provided in the BD-RE dual layer 200.

3. DISCLOSURE OF INVENTION

Therefore, it is one object of the present invention to provide a high-density multi-layer optical disc such as a Blu-ray disc rewritable (BD-RE) dual layer and a method for managing layer formatting thereof, which can record and manage management information needed for identifying formatting status associated with multiple recording layers formed on the disc and automatically perform a formatting operation of an unformatted recording layer, or perform the formatting operation in response to a user's selection.

In accordance with one aspect of the present invention, the above and other objects can be accomplished by the provision of a high-density multi-layer optical disc, comprising: a plurality of recording layers formed thereon; and management information, additionally recorded in a specified area thereof, needed for identifying formatting status of the recording layers.

In accordance with another aspect of the present invention, there is provided a method for managing layer formatting of a high-density multi-layer optical disc, comprising the steps of: (a) reading management information indicating formatting status of recording layers, while the management information being recorded in a specified area of the high-density multi-layer optical disc; (b) determining formatting status of recording layers based on the read management information; and (c) performing a formatting operation automatically or in response to a user's selection for at least one unformatted recording layer according to a result of the determination.

4. BRIEF DESCRIPTION OF DRAWINGS

The accompanying drawings, which are included to provide a further understanding of the invention, illustrate the preferred embodiments of the invention, and together with the description, serve to explain the principles of the present invention.

FIGS. 7A and 7B are flowcharts illustrating the method for managing layer formatting of a high-density multi-layer optical disc in accordance with the present invention.

Features, elements, and aspects of the invention that are referenced by the same numerals in different figures represent the same, equivalent, or similar features, elements, or aspects in accordance with one or more embodiments.

5. MODES FOR CARRYING OUT THE INVENTION

A high-density multi-layer optical disc and a method for managing layer formatting thereof in accordance with preferred embodiments of the present invention will be described in detail with reference to the annexed drawings.

Figure 1:
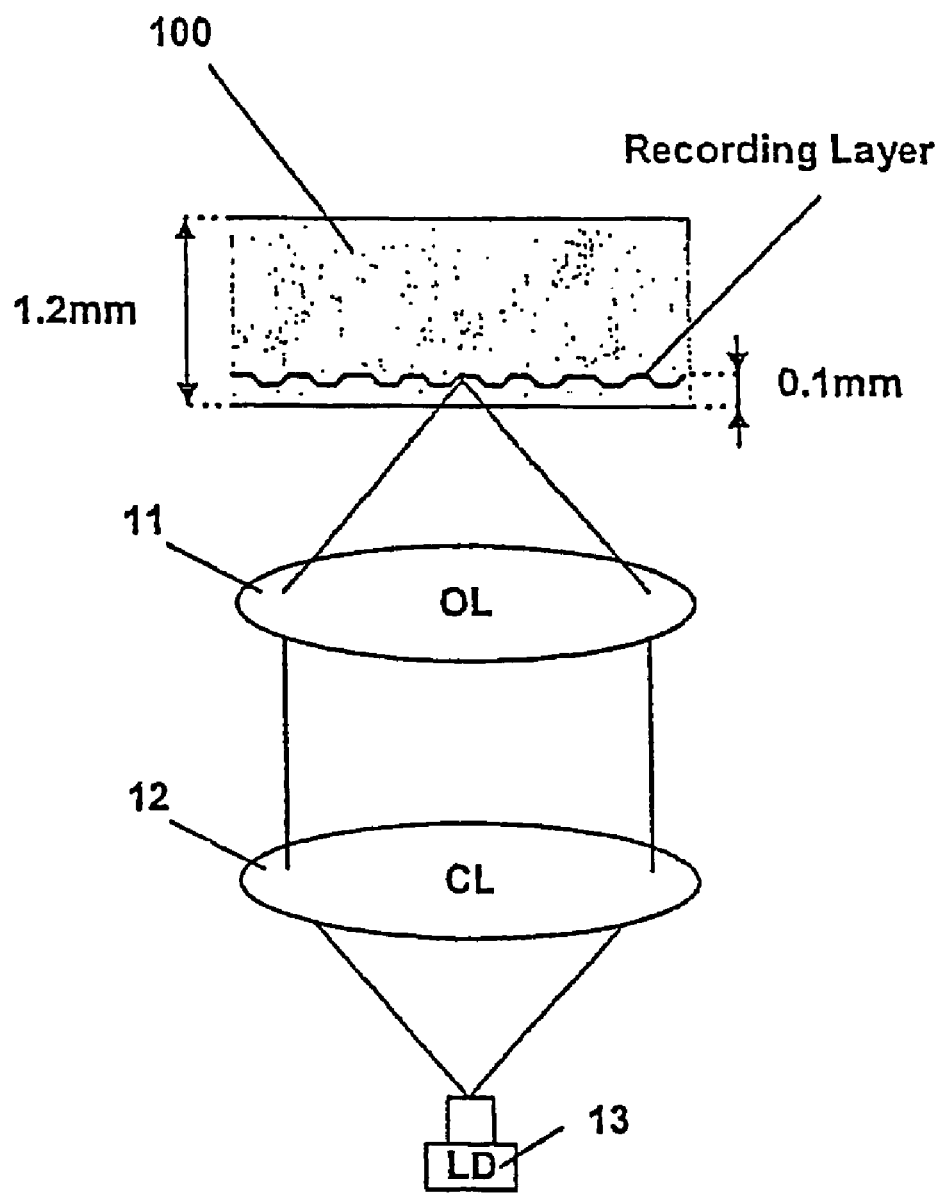
FIG. 1 is a view illustrating the structure of a conventional Blu-ray disc rewritable (BD-RE)
Figure 2:
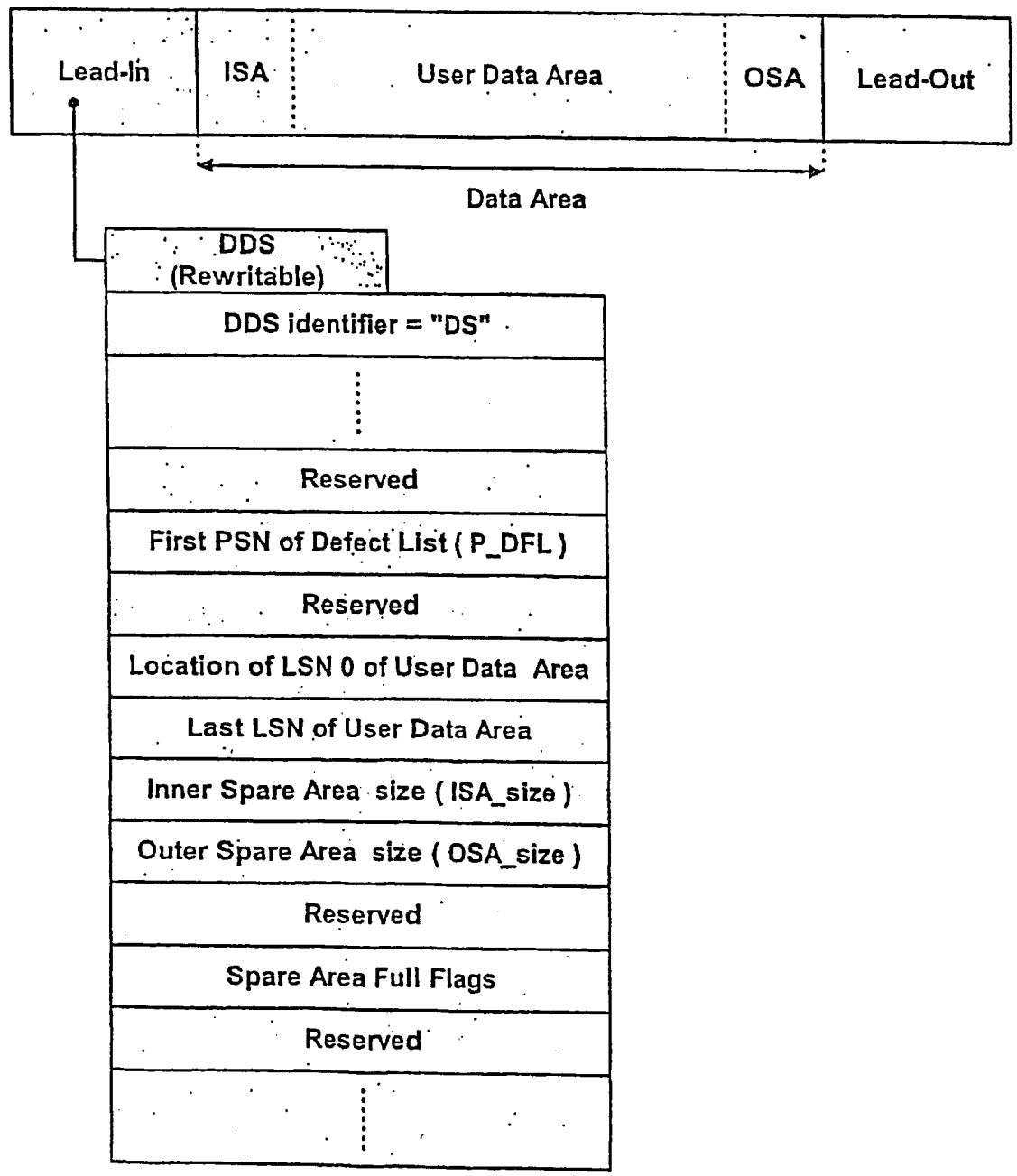
FIG. 2 is a table illustrating disc definition structure (DDS) information recorded and managed in a lead-in area of the conventional BD-RE.
Figure 3:
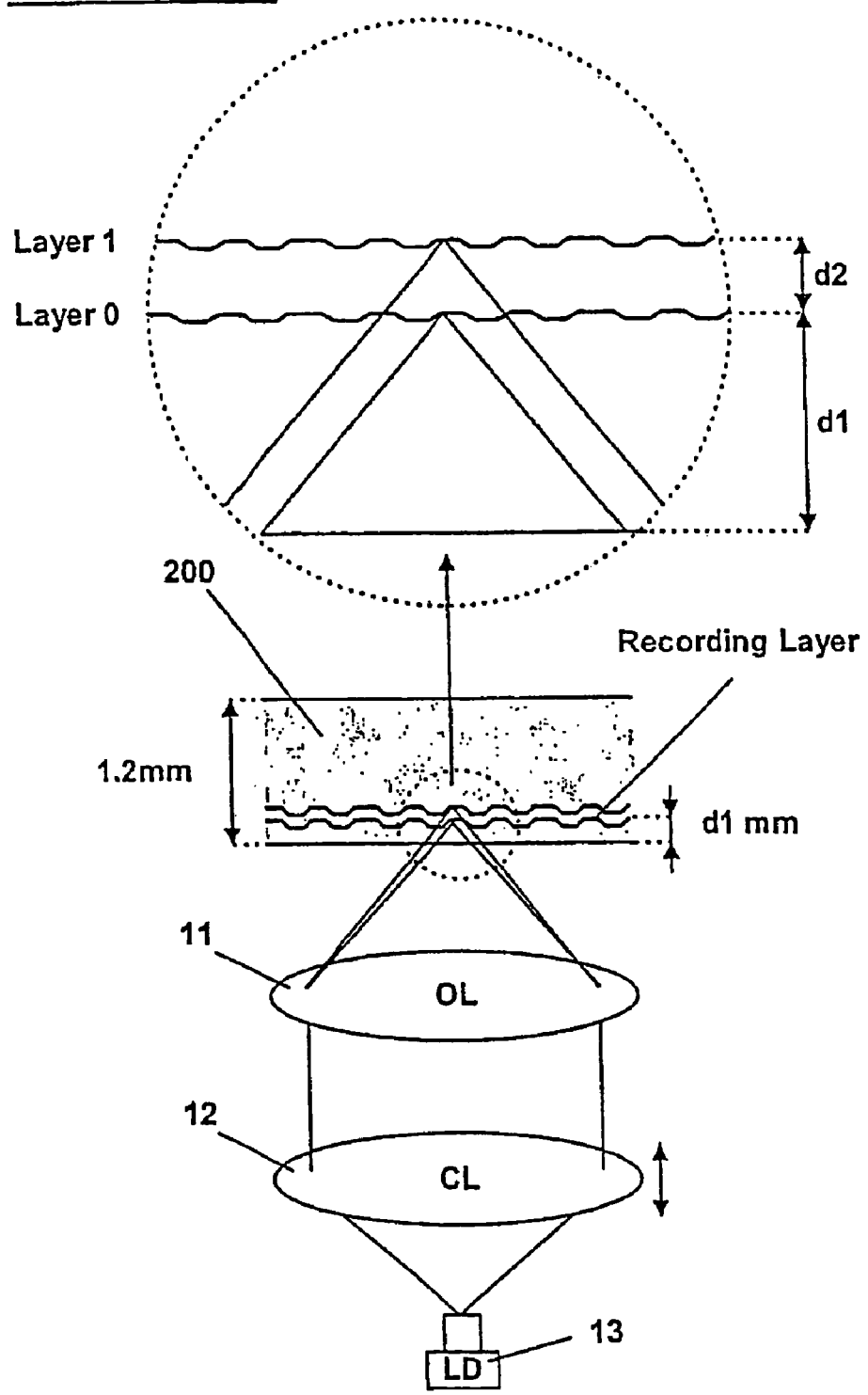
FIG. 3 is a view illustrating the structure of a high-density dual-layer optical disc.
Figure 4:
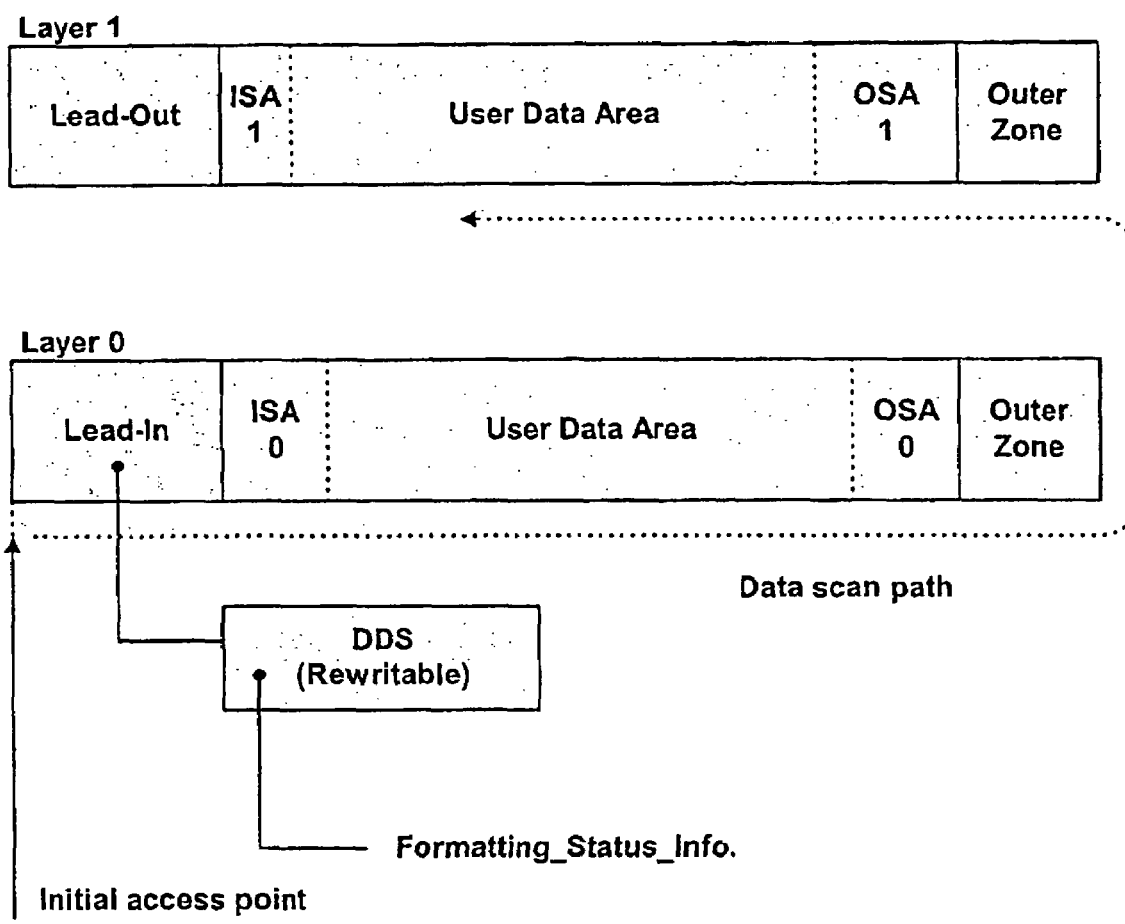
FIG. 4 is a view illustrating a state where disc definition structure (DDS) information is contained in a lead-in area of the high-density dual-layer optical disc in accordance with the present invention.

FIG. 4 is a view illustrating a state where disc definition structure (DDS) information is contained in a lead-in area of a high-density dual-layer optical disc in accordance with the present invention.

As shown in FIG. 4, the lead-in area is assigned to the first recording layer (Layer 0) and a lead-out area is assigned to the second recording layer (Layer 1) in a high-density multi-layer optical disc, e.g., a Blu-ray disc rewritable (BD-RE) dual layer 200, in accordance with the present invention. The first inner spare area (ISA) (ISA0) and first outer spare area (OSA0) 1 are separately assigned to a data area for the first recording layer. The second ISA (ISA1) and second OSA (OSA1) are separately assigned to a data area for the second recording layer.

Management information needed for managing a plurality of spare areas separately assigned to the data area for each recording layer and defect management address (DMA) information needed for managing a defect are rewritable disc definition structure (DDS) information. The rewritable DDS information can be recorded and managed in the lead-in area of the first recording layer. The DDS information can include formatting status information needed for identifying the respective formatting status of the first and second recording layers, e.g., as being formatted or unformatted albeit formattable. Also, the DDS information can include the last verified address (LVA) pointer for each layer. The LVA pointer can specify the first physical sector number (PSN) for the last cluster that has been formatted by a formatting operation. Such pointers, e.g., are only valid when the disc has been partially formatted and when a formatting operation is in progress.

Figure 5:
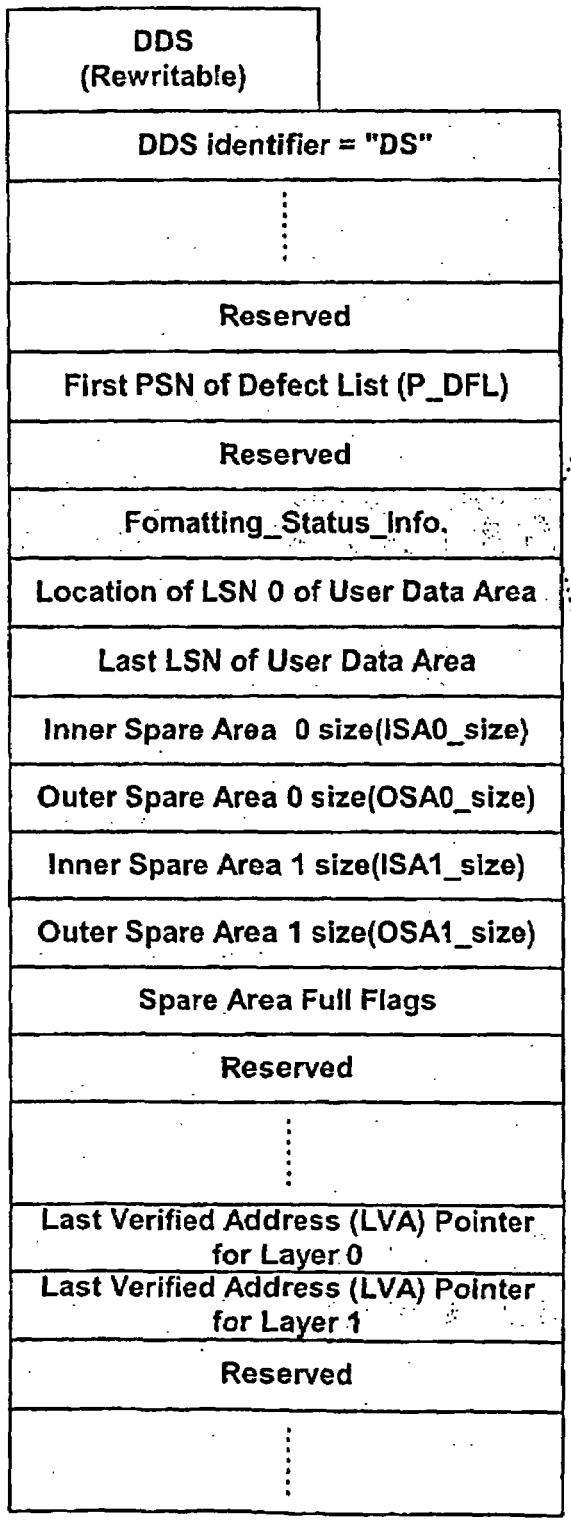
FIG. 5 is a table illustrating the DDS information recorded and managed in the lead-in area of the high-density dual-layer optical disc in accordance with the present invention.

FIG. 5 is a table illustrating the DDS information recorded and managed in the lead-in area of the high-density dual-layer optical disc in accordance with the present invention.

As shown in FIG. 5, the DDS information includes information items associated with the first physical sector number (PSN) of a defect list (DFL) (P_DFL), a location of a logical sector number (LSN) 0 of a user data area, the last LSN of the user data area, a size of the first ISA (ISA0_size) for the first recording layer, a size of the second ISA (ISA1_size) for the second recording layer, a size of the first OSA (OSA0_size) for the first recording layer, a size of the second OSA (OSA1_size) for the second recording layer, spare area full flags indicating whether or not the respective spare areas are full, the formatting status information (Formatting_Status_Info.) having the predetermined number of bits, last verified address (LVA) pointer for the first recording layer, and last verified address (LVA) pointer for the second recording layer.

For example, where Formatting_Status_Info.="00", the 2-bit formatting status information indicates the status in which the first and second recording layers are not formatted. Where Formatting_Status_Info.="01", the 2-bit formatting status information indicates the status in which only the first recording layer is formatted. Where Formatting_Status_Info.="10", the 2-bit formatting status information indicates the status in which only the second recording layer is formatted. Where Formatting_Status_Info. "11", the 2-bit formatting status information indicates the status in which the first and second recording layers are formatted.

A recording layer indicated as unformatted by Formatting_Status_Info. can be a partially formatted layer. And if a recording layer has been partially formatted, the first physical sector number (PSN) of the last cluster that has been formatted can be written in the last verified address (LVA) pointer for the recording layer. So a formatting operation for a partially formatted recording layer could be continued from the PSN of the LVA pointer for the partially formatted recording layer.

The optical disc apparatus searches for and confirms the formatting status information. The optical disc apparatus determines whether the respective recording layers of the BD-RE dual layer 200 loaded in the apparatus are formatted to record the data. According to a result of the determination, the optical disc apparatus automatically formats an unformatted recording layer using a predetermined formatting method, e.g., a background formatting method, or performs a series of formatting operations using a formatting method selected or designated by the user. The above-described procedure will be described in detail.

Figure 6:
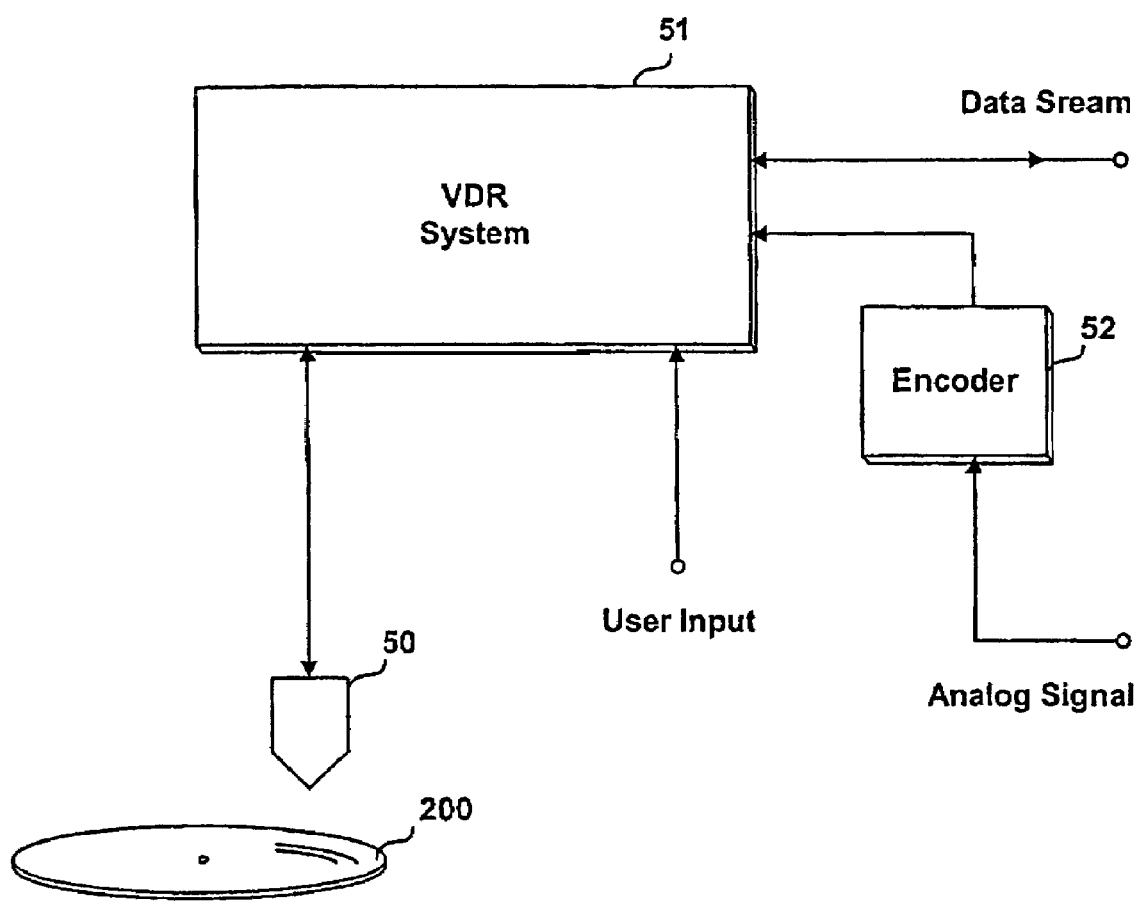
FIG. 6 is a view illustrating the configuration of an optical disc apparatus to which a method for managing layer formatting of a high-density multi-layer optical disc is applied in accordance with the present invention.

FIG. 6 is a view illustrating a configuration of the optical disc apparatus to which the method for managing layer formatting of a high-density multi-layer optical disc is applied in accordance with the present invention. For example, an optical disc apparatus such as a video disc recorder (VDR) for recording or reproducing data of a BD-RE dual layer includes an optical pick-up 50 for reading data recorded on a high-density multi-layer optical disc 200 such as the BD-RE dual layer or recording a data stream corresponding to a processed signal; a VDR system 51 for performing a signal processing operation so that a signal of the data read by the optical pick-up 50 can be reproduced or converting an externally inputted data stream into a data stream appropriate for recording; and an encoder 52 for encoding an externally inputted analog signal and outputting the encoded analog signal to the VDR system 51.

Figure 7A:
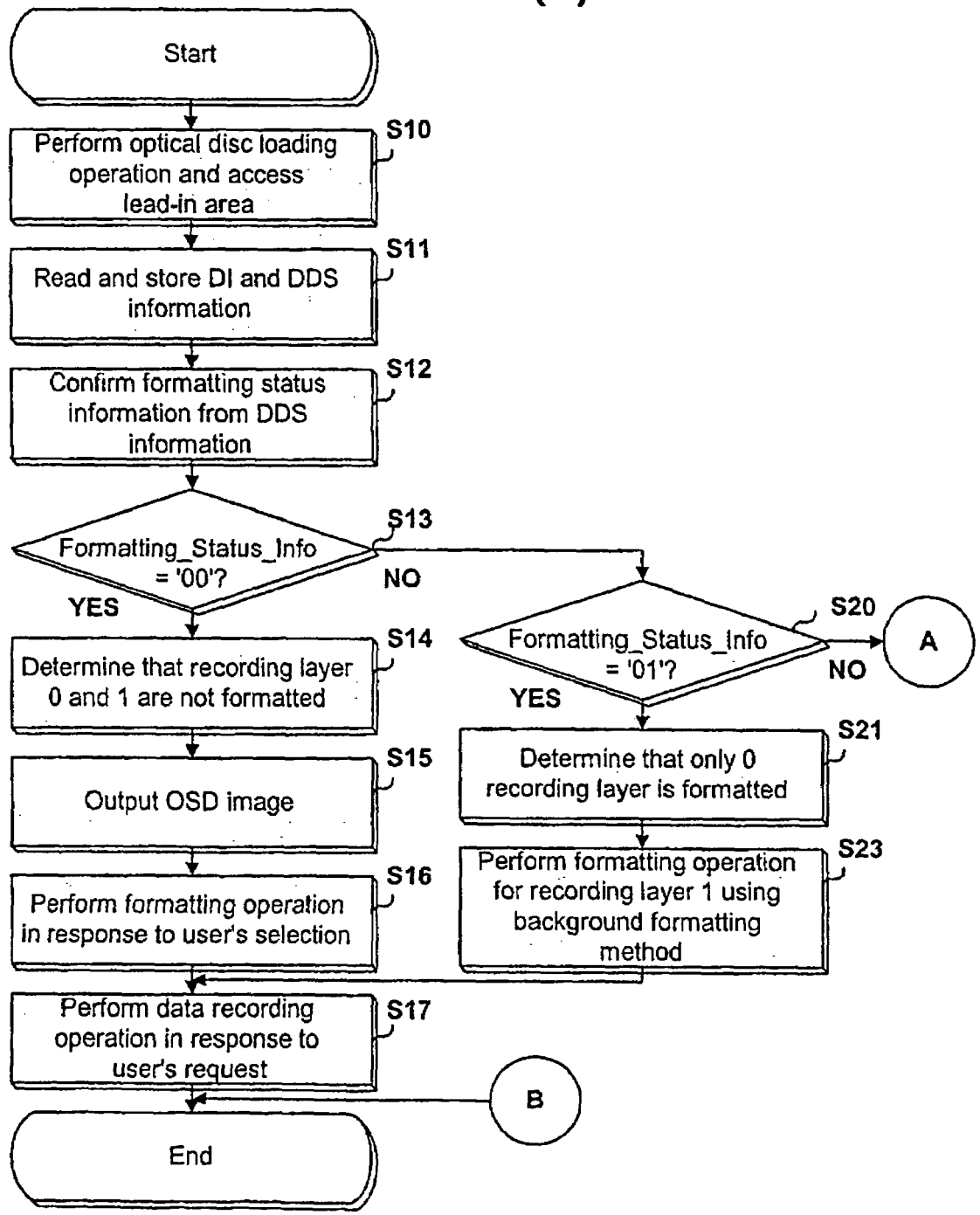
Figure 8:
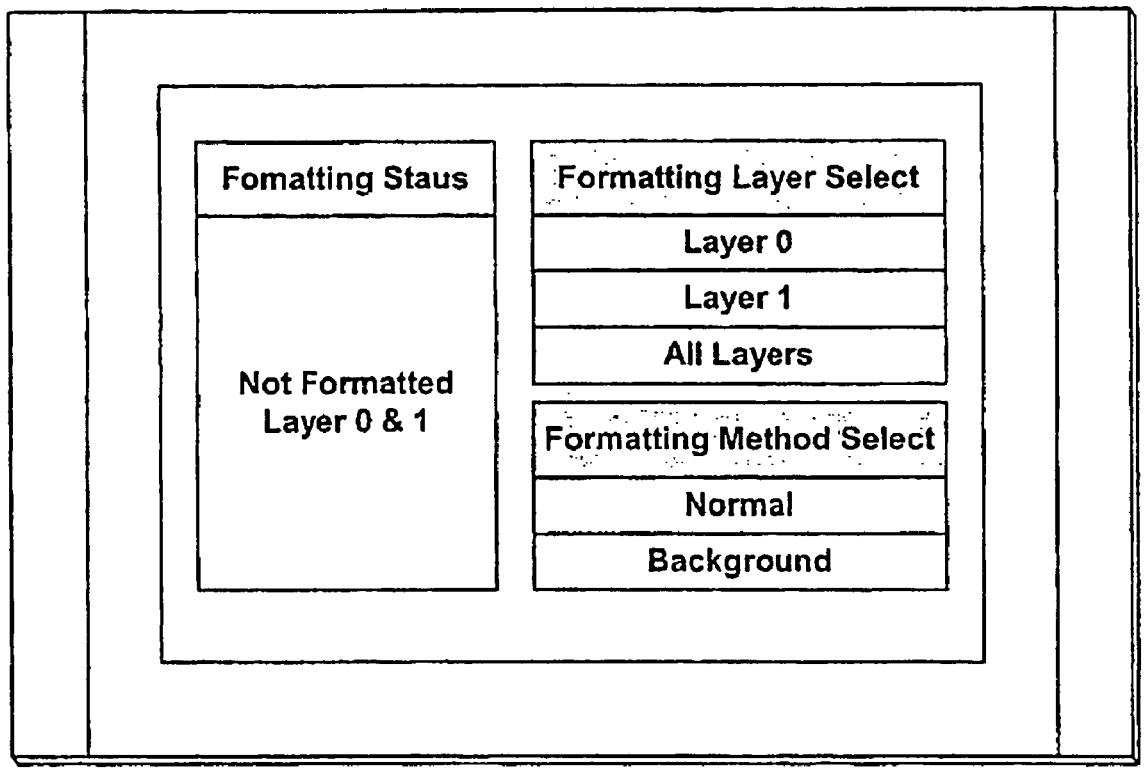
FIG. 8 is a view illustrating an image of an on-screen display (OSD) displayed by the method for managing layer formatting of a high-density multi-layer optical disc in accordance with the present invention.

FIGS. 7A and 7B are flowcharts illustrating the method for managing layer formatting of a high-density multi-layer optical disc in accordance with the present invention.

As shown in FIGS. 7A and 7B, where the high-density multi-layer optical disc, e.g., the BD-RE dual layer 200, is inserted and loaded in the VDR system 51 of the optical disc apparatus, a sequence of optical disc loading operations is performed and a lead-in area of the optical disc is accessed at step S10.

Then, the VDR system 51 reads disc information (DI) and disc definition structure (DDS) information recorded in the lead-in area and then stores the read information in an internal memory (not shown) provided in the optical disc apparatus at step S11. At this time, the DDS information containing formatting-status information is stored in the memory at the above step S11.

Then, the VDR system 51 confirms the formatting status information at step S12. Where the formatting status information (Formatting_Status_Info.)="00", the VDR system 51 determines that the first and second recording layers of the BD-RE dual layer 200 are not formatted at step S14.

For example, an image of an on-screen display (OSD) containing a message indicating that the first and second recording layers are not formatted, a selection menu for allowing the user to select the first recording layer and/or the second recording layer to be formatted, etc., is displayed through the screen of a television coupled to the optical disc apparatus at step S15.

The VDR system 51 performs a formatting operation for the first recording layer and/or the second recording layer selected by the user at step S16. At this time, the formatting operation is based on a general formatting method or a background formatting method.

Then, the VDR system 51 can appropriately perform a data recording operation for recording data on the formatted first recording layer and/or second recording layer in response to the user's request at step S17.

On the other hand, where the formatting status information (Formatting_Status_Info.)="01" at step S20, the VDR system 51 determines that only the first recording layer of the BD-RE dual layer 200 is formatted at step S21.

Then, the VDR system 51 automatically performs the formatting operation for the unformatted second recording layer using the predetermined background formatting method at step S23.

Then, the VDR system 51 can appropriately perform the data recording operation for recording the data on the formatted first or second recording layer in response to the user's request at the above step S17.

On the other hand, where the formatting status information (Formatting_Status_Info.)="10" at step S30, the VDR system 51 determines that only the second recording layer of the BD-RE dual layer 200 is formatted at step S31. Then, the VDR system 51 automatically performs the formatting operation for the unformatted first recording layer using the predetermined background formatting method at step S32. Then, the VDR system 51 appropriately performs the data recording operation for recording the data on the formatted first or second recording in response to the user's-request layer at step S33.

On the other hand, where the formatting status information (Formatting_Status_Info.)="11", the VDR system 51 determines that the first and second recording layers of the BD-RE dual layer 200 are formatted at step S40. Then, the VDR system 51 can perform the data recording operation in response to the user's request without additionally performing the formatting operation at the above step S33.

Meanwhile, a partially formatted recoding layer indicated as unformatted by the Formatting_Status_Info. can be formatted from the PSN of the LVA pointer for the partially formatted recording layer. The formatting operation for the partially formatted recording layers can be continued from the PSN of the LVA pointer for the partially formatted recording layers at the above steps S16, S23, and S32.

As apparent from the above description, the present invention provides a high-density multi-layer optical disc and a method for managing layer formatting thereof, which can conveniently and effectively format multiple recording layers formed on the high-density multi-layer optical disc.

The preferred embodiments of the present invention have been disclosed for illustrative purposes. Those skilled in the art will appreciate that various modifications, additions and substitutions are possible, without departing from the scope and spirit of the invention as disclosed in the accompanying claims.

The invention claimed is:

1. A multi-layer optical disc, comprising:
   a plurality of recording layers including a first recording layer and a second recording layer; and
   management information, recorded in a lead-in area of at least the first recording layer, for identifying a respective status of each of the recording layers as formatted or unformatted, and the management information being not recorded in a second recording layer.

2. The multi-layer optical disc as set forth in claim 1, wherein the management information is recorded in disc definition structure (DDS) information contained in the lead-in area of the first recording layer.

3. The multi-layer optical disc as set forth in claim 2, wherein the management information comprises the status information indicating that none of first and second recording layers are formatted, or only the first or second recording layer is formatted, or all of the first and second recording layers are formatted, if the multi-layer optical disc is a dual-layer optical disc.

4. The multi-layer optical disc as set forth in claim 1, further comprises position information for respective recording layers, the position information specifying a first physical sector number (PSN) of a last data unit that has been formatted.

5. A method for managing layer formatting of a multi-layer optical disc, the method comprising:
   (a) reading management information indicating a respective formatting status of each one among the recording layers as formatted or unformatted, the management information being recorded in a lead-in area of a first recording layer of the multi-layer optical disc, and the management information being not recorded in a second recording layer;
   (b) determining formatting status of one or more recording layers formatted based on the read management information; and
   (c) performing a formatting operation for at least one unformatted recording layer according to a result of the determination.

6. The method as set forth in claim 5, wherein the step (a) further comprises:
   (a-1) searching for control information contained in the lead-in area located at the first recording layer of the multi-layer optical disc; and
   (a-2) reading the management information indicating each formatting status of recording layers from the control information.

7. The method as set forth in claim 5, wherein the step (c) includes automatically performing the formatting operation using a predetermined formatting method or by performing the formatting operation in response to receipt of a user's selection.

8. The method as set forth in claim 7, wherein the predetermined formatting method is a background formatting method.

9. The method as set forth in claim 5, wherein the step (a) further comprises the step of reading position information for respective recording layers, the position information specifying a first physical sector number of the last unit that has been formatted.

10. The method as set forth in claim 9, wherein the step (c) includes continuing a formatting operation for said at least one unformatted recording layer from the PSN contained in the read position information.

11. The method as set forth in claim 5, wherein the step (b) further includes:
recognizing based upon the read management information whether a condition is satisfied or not, the condition being that one or more but fewer than all recording layers are unformatted albeit formattable; and
determining the one or more layers to be formatted when the condition is satisfied.

12. A method for managing layer formatting of a multi-layer optical disc, the method comprising:
a) reading management information indicating formatting status of each one among the recording layers, the management information being recorded in a specified area of the multi-layer optical disc;
(b) determining formatting status of one or more recording layers formatted based on the read management information; and
(c) performing a formatting operation for at least one unformatted recording layer according to a result of the determination;
wherein the step (c) includes generating and outputting an image of a message indicating that all recording layers are not formatted if none of the recording layers are formatted as the result of the determination, and performing the formatting operation in response to users selection.

13. The method as set forth in claim 12, wherein the message comprises a selection menu for allowing the user to select said at least one unformatted recording layer to be formatted and a formatting method.

14. A method for managing layer formatting of a multi-layer optical disc, the method comprising:
(a) reading management information from a control information area located in a lead-in area of a first recording layer of the optical disc, the management information indicating respective formatting status of the recording layers as formatted or unformatted, and the management information being not recorded in a second recording layer; and
(b) identifying unformatted or formatted recording layers of the multi-layer optical disc based on the management information.

15. The method as set forth in claim 14, further comprising:
searching for control information contained in the first layer of the multi-layer optical disc; and
obtaining the management information from the control information.

16. The method as set forth in claim 14, further comprising:
(c) determining a formatting operation of one or more unformatted recording layers as a result of step (b).

17. A machine-actionable memory comprising a plurality of machine-actionable records arranged according to a data structure, the data structure including:
at least two user-data areas provided on at least two of the multiple layers of the optical disc, respectively; and
a management area to store management information for accessing the multi-layer optical disc, the management area being located in a lead-in area of a first recording layer of the multiple layers, being not recorded in a second recording layer, and including:
a formatting status information to store a respective indication of whether each one of the multiple layers is formatted or unformatted.

18. The machine-actionable memory of claim 17, wherein the formatting status area is an N-bit field, where N is an integer number.

* * * * *